United States Patent [19]

Latsch

[11] 4,321,898
[45] Mar. 30, 1982

[54] INTERNAL COMBUSTION ENGINE WITH TEMPERATURE CONTROLLED COMBUSTION CHAMBER WALLS

[75] Inventor: Reinhard Latsch, Vaihingen, Fed. Rep. of Germany

[73] Assignee: Robert Bosch GmbH, Stuttgart, Fed. Rep. of Germany

[21] Appl. No.: 183,910

[22] Filed: Sep. 4, 1980

Related U.S. Application Data

[63] Continuation of Ser. No. 946,224, Sep. 27, 1978, abandoned.

[30] Foreign Application Priority Data

Nov. 16, 1977 [DE] Fed. Rep. of Germany ....... 2751156

[51] Int. Cl.³ ............................................. F02B 19/16
[52] U.S. Cl. ................................... 123/254; 123/263; 123/271
[58] Field of Search ............... 123/254, 255, 262, 263, 123/270, 271; 313/143

[56] References Cited

U.S. PATENT DOCUMENTS

| | | | |
|---|---|---|---|
| 2,171,929 | 9/1939 | Gazda | 313/143 |
| 2,787,258 | 4/1957 | Schumann | 123/263 |
| 2,855,908 | 10/1958 | Pflaum | 123/262 |
| 3,179,091 | 4/1965 | Leunig | 123/254 |

FOREIGN PATENT DOCUMENTS 1900585 8/1970 Fed. Rep. of Germany .

*Primary Examiner*—Craig R. Feinberg
*Attorney, Agent, or Firm*—Edwin E. Greigg

[57] ABSTRACT

An internal combustion engine in which some of the combustion chamber walls are kept at temperatures which are higher than the temperature of the remaining parts of the combustion chamber. The temperature control of the selected portions of the combustion chamber is performed by heat pipes which lie adjacent to thin combustion chamber walls and which transfer heat from these walls to other parts of the engine which are adjacent to coolant channels. The presence of the heat pipe insures a relatively low thermal inertia of the adjacent combustion chamber walls, permitting their rapid heating after cold starting and the presence of the heat pipe prevents excessive temperatures due to the ability to carry away heat from these parts of the combustion chamber at higher temperatures. The temperature-controlled combustion chamber walls may be provided in auxiliary combustion chambers, prechambers or antechambers. Fuel is preferably injected so as to impinge on the temperature-controlled parts of the combustion chamber.

1 Claim, 3 Drawing Figures

INTERNAL COMBUSTION ENGINE WITH TEMPERATURE CONTROLLED COMBUSTION CHAMBER WALLS

This is a continuation, of application Ser. No. 946,224, filed Sept. 27, 1978 now abandoned.

BACKGROUND OF THE INVENTION

The invention relates to internal combustion engines with combustion chambers whose walls are partially held at an elevated temperature by preventing the heat transfer to cooler parts of the engine. In known combustion chambers of this type, especially those used in conjunction with antechambers in stratified charge engines, the antechambers are substantially dome-shaped inserts with thin walls which, at low temperatures, maintain an insulating clearance from the cooled combustion chamber walls but which, after being heated, make contact with the cooled combustion chamber walls due to thermal expansion of the material and thereafter permit heat transport away from the chamber to prevent its overheating.

These known systems, however, have an inherently large thermal inertia and thus require a relatively long time to reach the wall temperature which is necessary for optimum mixture preparation after, for example, a cold engine start. Furthermore, they are subject to large temperature fluctuation during the operation of the engine because the thermal inertia permits only incomplete temperature control of the surface of the combustion chamber. This is especially the case during sudden changes of the power output of the engine which may lead to overheating of the combustion chamber walls.

On the other hand, modern experiments have shown that when combustion chamber walls are held at relatively high temperatures, and fuel is injected onto these hot surfaces, the overall smoke emission and hydrocarbon emission of the engine may be significantly reduced.

OBJECT AND SUMMARY OF THE INVENTION

It is thus a principal object of the present invention to provide an internal combustion engine having a combustion chamber which is so constructed as to be well insulated thermally with respect to cool portions of the engine whenever the combustion chamber walls are relatively cold, thereby permitting an early heating of these walls to the desired high temperature and to maintain this high temperature even when the load conditions of the engine change. Accordingly, it is a second principal object of the invention to provide a rapidly acting and highly responsive temperature regulation of the combustion chamber walls. These and other objects are attained according to the present invention by the installation of one or more heat pipes between selected portions of the combustion chamber or the combustion antechamber and cooled parts of the engine or the cylinder head. The presence of the heat pipes permits rapid temperature changes of the walls of the combustion chamber due to the possibility of transporting large amounts of heat through the heat pipe which has a very high degree of thermal conductivity.

In a particular embodiment of the invention, the combustion chamber is extended into the top of the piston and the heat pipe or pipes is or are located between the walls of this depression and the body of the piston.

The invention will be better understood as well as further objects and advantages thereof become more apparent from the ensuing detailed description of several exemplary embodiments of the invention.

DETAILED DESCRIPTION OF THE INVENTION

Figure 1:
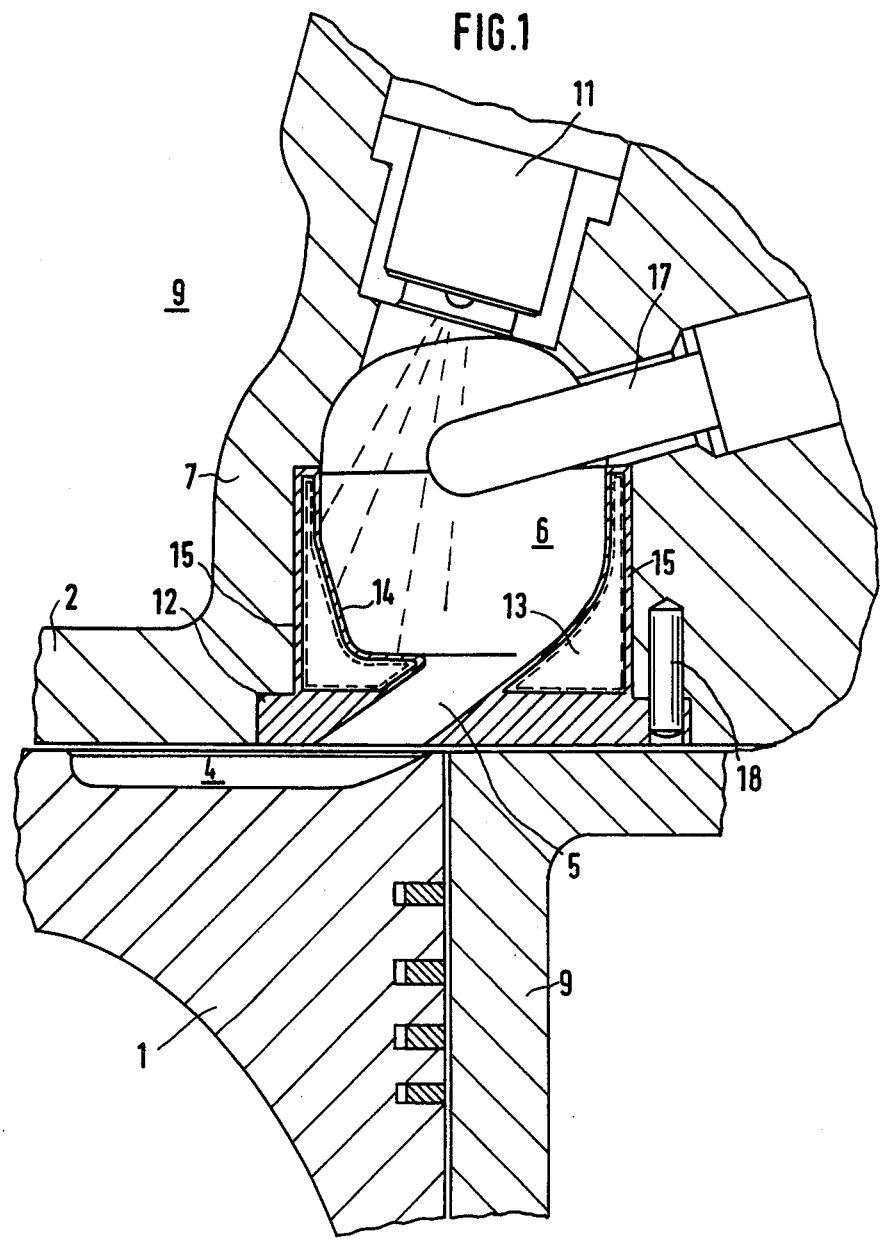
FIG. 1 is a sectional view of a first embodiment of the invention illustrating a swirl chamber insert in a cylinder head of an internal combustion engine.

Turning now to FIG. 1, there will be seen a partial, sectional representation of a reciprocating internal combustion engine. Shown partially is a piston 1 moving within a cylinder 3 and defining a main combustion chamber 4 which is closed on top by a cylinder head 2. Disposed within the cylinder head is a swirl chamber 6 which communicates with the main combustion chamber 4 via a transfer channel 5. The walls 7 of the swirl chamber 6 are shown to be in contact with coolant flowing through channels 9 of the cylinder head.

A fuel injection valve 11 is shown to be installed in the cylinder head in a location roughly opposite to the terminus of the transfer channel 5 in the swirl chamber 6 and the fuel jet is directed substantially tangentially to that part of the circular swirl chamber adjacent to the transfer channel. The lower part of the swirl chamber is seen to be defined by a dome-shaped insert 12 which comprises approximately one-half of the spherical volume of the swirl chamber and which also includes the transfer channel 5 which terminates tangentially in the main combustion chamber 4. Disposed in the walls of the dome-shaped insert 12 is a heat pipe 13 one of whose surface walls constitutes the combustion chamber wall 14 whose temperature is to be controlled and which is very thin while the other wall 15 of the heat pipe is in thermally conducting contact with parts of the cylinder head which are cooled directly by coolant. In known manner, the heat pipe is filled partially, for example, with lithium or sodium, depending on the temperature at which the maximum heat transport capability of the heat pipe is to occur, i.e. depending on the desired temperature of the combustion chamber wall 14. In order to enhance the transport of, for exmaple, sodium which has condensed in the condensation zone of the wall 15, to the temperature-controlled combustion chamber wall which constitutes the evaporation zone, there may be disposed within the heat pipe and in known manner a fine-mesh wire net following the internal contour of the walls of the heat pipe.

Further disposed in the upper portion of the swirl chamber is a known glow plug 17 which serves to preheat the swirl chamber prior to engine starting. An alignment pin 18 secures the location of the dome-shaped insert 12 in the cylinder head.

The disposition of the heat pipe within the insert which constitutes the swirl chamber permits the walls which are wetted by fuel from the injection nozzle 11 to have a regulated temperature. When the engine is started cold, the heat pipe 13 serves to thermally insulate the combustion chamber wall 14 from the cooled walls 7 of the cylinder head. For this reason, the very thin wall 14 can heat up rapidly and thus quickly reaches the temperature at which the fuel injected into the swirl chamber undergoes optimum vaporization without however permitting destructive thermal effects of its surface. These destructive effects are prevented due to the fact that the excellent conductivity of the heat pipe prevents overheating of the walls in contact with the combustion process. Furthermore, the heat pipe responds rapidly to temperature changes, for example due to changes in engine load, because the thermal transport within the heat pipe is very profuse and rapid.

Figure 2:
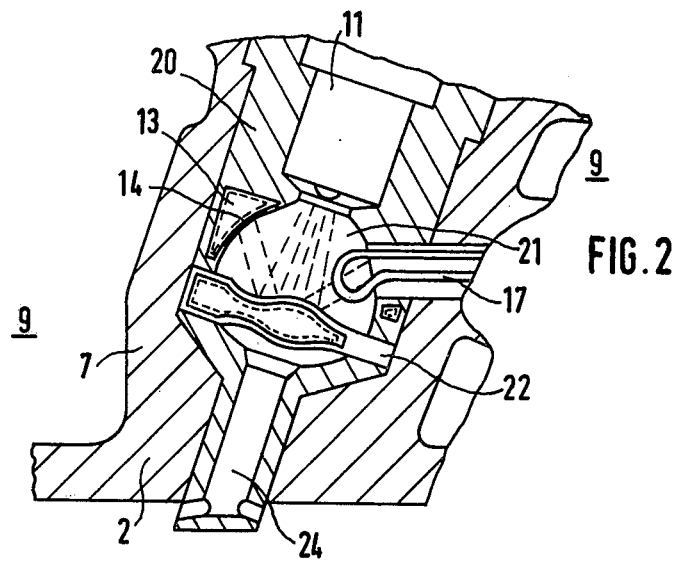
FIG. 2 is a sectional view of a second embodiment of the invention in an antechamber of an internal combustion engine.

FIG. 2 illustrates another embodiment of the invention where the cylinder head is shown to be provided with an antechamber insert 20 within a cylinder head 2. The antechamber, which may be of known construction, has a spherical combustion chamber 21, one end of which admits the tip of the fuel injection valve 11 and the other end of which communicates with a transfer channel 24 that leads to the main combustion chamber of the engine. In known manner, a glow plug 17 penetrates into the antechamber for the purpose of preheating.

As was the case in the embodiment of FIG. 1, the temperature-controlled combustion chamber walls 14 of the combustion chamber 21 serve as defining walls of one or more heat pipes 13. Furthermore, or as an alternative thereto, a separate heating element 22 for vaporization of the fuel is provided in the lower third of the spherical combustion chamber 21 and lying in a direction which is transverse to the direction of the injected fuel jets. The heating element 22 is also a heat pipe which penetrates the entire antechamber insert and makes contact with the cooled wall 7 of the cylinder head.

By embodying the heating element as a heat pipe, this heating element rapidly reaches optimum temperature and yet is protected against overheating because if the thermal load becomes too high, large quantities of heat may be transferred out of the combustion chamber via the heat pipes.

Figure 3:
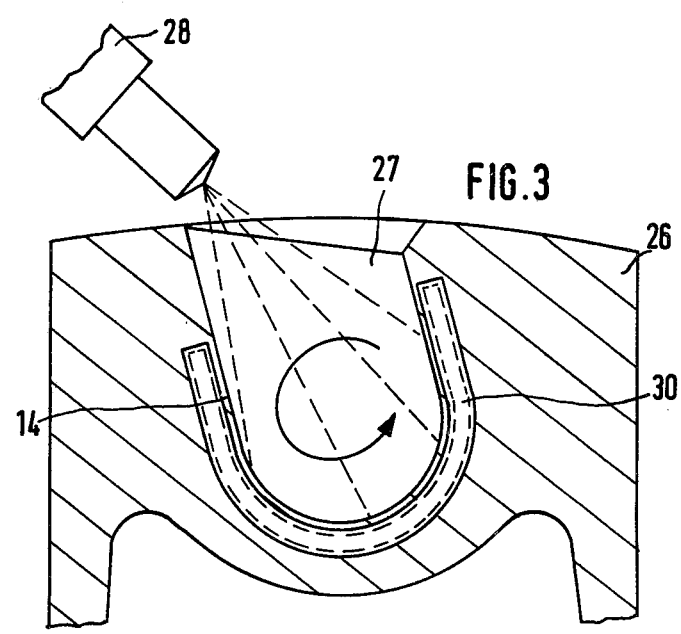
FIG. 3 is a third embodiment illustrating the invention in a piston recess.

FIG. 3 illustrates a third variant of the embodiment of the invention in which a piston 26 of an internal combustion engine is provided with a recessed combustion chamber 27 into which fuel is injected substantially tangentially by an injection valve 28 in one or several separate jets. In this engine type, the fuel is injected onto the heated wall of the piston top where it is dislocated and vaporized due to the intense rotary motion of the air during the compression stroke. It is important for the correct functioning of this system that the surface of the dome-shaped recessed combustion chamber 27 is at a relatively high temperature without reaching excessive temperatures. These latter temperatures are prevented by disposing, according to the invention, a heat pipe 30 in the top of the piston 26 which envelops the surfaces of the combustion chamber 27 and permits thermal communication between these walls and cooled portions of the piston. One side of the heat pipe thus defines the temperature-controlled combustion chamber wall 14 of the combustion chamber 27. The heat pipe itself may be constructed in known manner as already described in the example of FIG. 1 and provides the same advantages as described there. Furthermore, the reciprocal motion of the piston tends to increase the rate of heat transfer through the heat pipe due to the agitation of the sodium contents of the heat pipe which tends to bring the sodium contents more quickly from the cooled parts of the heat pipe to the evaporation region, i.e. the temperature-controlled combustion chamber wall 14.

The foregoing relates to preferred exemplary embodiments of the invention, it being understood that other embodiments and variants thereof are possible without departing from the spirit and scope of the invention.

What is claimed and desired to be secured by letters patent of the United States is:

1. An internal combustion engine comprising a main combustion chamber and an adjacent auxiliary combustion chamber, a first heat pipe means within said auxiliary combustion chamber including an inner wall and having at least one closed hollow chamber disposed adjacent to a normally cooled part of the engine such that said first heat pipe means defines at least a selected portion of the wall of said auxiliary combustion chamber, further having a structure mounted such that the structure retains a vaporizable medium against the inner wall of the at least one closed hollow chamber; whereby the temperature of said selected portion is influenced by the flow of heat from said auxiliary combustion chamber to said normally cooled part of the engine via said first heat pipe means, thereby maintaining the temperature of said selected portion of the wall of said auxiliary combusion chamber higher than the temperature of the remaining portions of the auxiliary combustion chamber walls; further comprising a second heat pipe means having a closed hollow chamber containing a vaporizable medium therewithin and disposed in said axuiliary combustion chamber and extending substantially transverse with respect to the direction of the fuel jet from an injection valve in an area below said first heat pipe, said second heat pipe means serving as a heating element and whose ends constitute the condensation region of said first heat pipe and are in contact with the normally cooled walls of said combustion chamber part of the engine, wherein said injection valve disposed to inject fuel into said combustion chamber is so placed as to direct fuel to impinge on said second heat pipe means and said selected portions of said combustion chamber; whereby the homogenization and ignitability of a resulting fuel mixture is improved.

* * * * *